Jan. 5, 1971          E. M. MARAS          3,553,643
BRAKE LINING WEAR INDICATOR
Filed Sept. 4, 1968
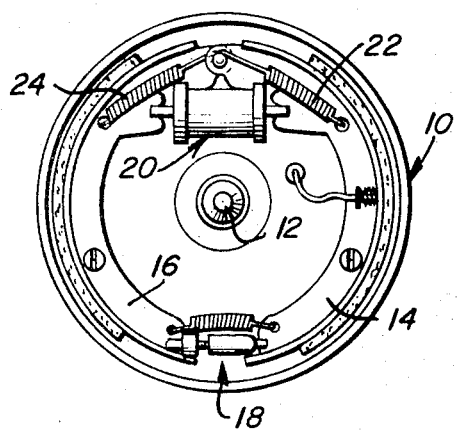
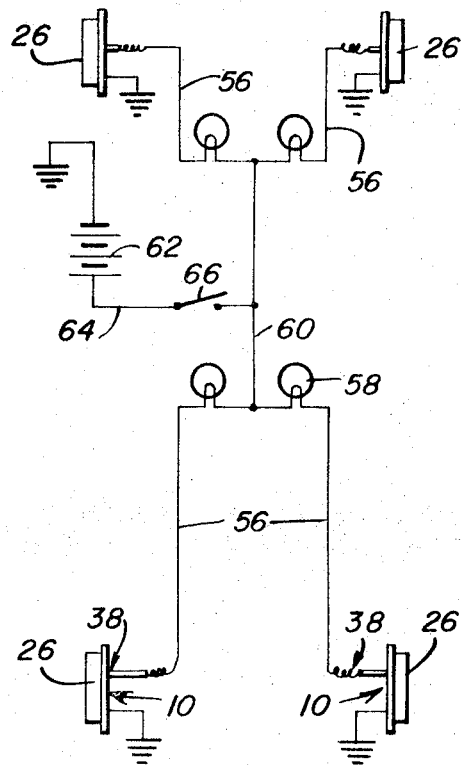
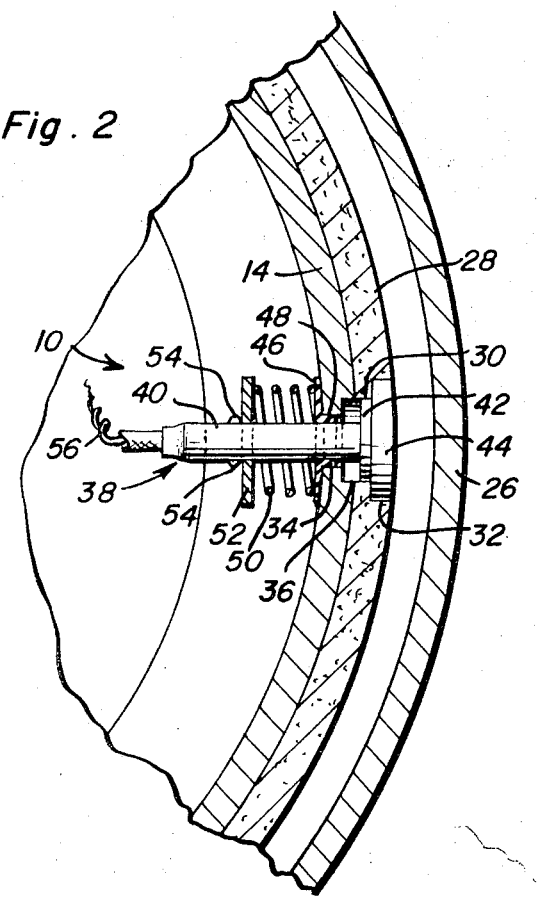
Edward M. Maras
INVENTOR.
BY *Clarence A. O'Brien*
and *Harvey B. Jacobson*
Attorneys

United States Patent Office 3,553,643
Patented Jan. 5, 1971

3,553,643
BRAKE LINING WEAR INDICATOR
Edward M. Maras, 14 Alys Drive E.,
Depew, N.Y. 14043
Filed Sept. 4, 1968, Ser. No. 757,417
Int. Cl. B60q 1/00
U.S. Cl. 340—52                                                       7 Claims

ABSTRACT OF THE DISCLOSURE

A lining wear and contact indicator for multi-wheeled vehicles operative to render a signal during the period the brake linings of a vehicle contact the associated brake drums and to also render a signal whenever the brake linings are worn beyond a predetermined amount, even when the brakes are not applied. The indicator of the instant invention may be utilized in conjunction with substantially all drum type brakes and it is preferred that the indicator be operatively associated with each wheel of a vehicle provided with a drum brake.

---

The indicator includes a contact recessed into the outer lining surface and disposed for engagement with the brake drum whenever the brake lining is forced into engagement with the drum. Engagement of the contact recessed in the brake lining with the brake drum serves to electrically complete a signal circuit operatively associated with a corresponding wheel and therefore a signal may be actuated in response to the brake linings contacting the associated drums. Of course, the various signals associated with the drum braked wheels of a vehicle should be electrically actuated at substantially the same time whenever the brakes are applied and operation of the signals should be terminated at substantially the same time whenever the brakes are released. Therefore, if all of the signals are simultaneously actuated and simultaneously deactivated, one may assume that the brake linings are being applied and released at substantially the same time. However, if one signal or the other lags behind the remainder of the signals either when applying the brakes or when releasing the brakes, the operator of the associated vehicle is given a signal that some of his wheel brakes are lagging by the unequal actuation and de-actuation of the signals to which the contact indicators are electrically connected.

Also, the contacts are operatively associated with the corresponding brake shoes and include structural features whereby the contacts will be automatically shifted into electrical contacting engagement with the associated brake shoes whenever the corresponding linings become worn a predetermined amount. In this manner, a continuous signal will be rendered, independent of actuation of the brakes, whenever the predetermined wear of the brake linings occurs and whenever the ignition switch of the vehicle is on.

A main object of this invention is to provide a brake lining wear and contact indicator which will be capable of rendering a signal whenever the associated brake linings are engaged with the corresponding brake drums.

Another object of this invention is to provide an indicator in accordance with the preceding object and including means by which a signal will be rendered whenever wear of an associated brake lining exceeds a predetermined amount.

A final object of this invention to be specifically enumerated herein is to provide a brake lining wear and contact indicator in accordance with the preceding objects which will conform to conventional forms of manufacture, be of simple construction and automatic in operation so as to provide a device that will be economically feasible, long lasting and relatively trouble-free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is an elevational view of a conventional drum brake assembly modified in accordance with the present invention;

FIG. 2 is an enlarged fragmentary vertical sectional view taken substantially upon a plane passing through the right hand portion of FIG. 1 and more clearly illustrating the electrical contact member operatively associated with the corresponding brake shoe and lining; and FIG. 3 is a diagrammatical view of the electrical circuitry of the invention as incorporated in a four-wheeled vehicle provided with drum brakes on all four wheels.

Referring now more specifically to the drawings, and to FIGS. 1 and 2 in particular, the numeral 10 generally designates a wheel backing plate outwardly from which a wheel supporting spindle 12 projects. A pair of brake shoes 14 and 16 are supported from the backing plate 10 and are generally conventional in configuration, being interconnected at one pair of adjacent ends by means of an adjustment mechanism referred to in general by the reference numeral 18 and having a hydraulic wheel cylinder referred to in general by the reference numeral 20 as well as a pair of return springs 22 and 24 operatively associated with the other pair of adjacent ends. Further, from FIG. 2 of the drawings, it may be seen that a brake drum 26, journalled from the spindle 12, is operatively associated with the brake shoes 14 and 16.

The preceding description may be considered as conventional and from FIG. 3 of the drawings it may be seen that a conventional four-wheeled vehicle is provided with a duplication of the preceding description at each wheel position.

With attention now invited more specifically to FIG. 2 of the drawings, it may be seen that each brake lining 28, carried by the corresponding brake shoe, is provided with a bore 30 formed therethrough including a counterbore 32 and that the corresponding brake shoe has a bore 34 formed therethrough concentric with the bore 30 and including a counterbore 36 of the same diameter as and which opens outwardly into the inner end of the bore 30.

A contact pin generally referred to by the reference numeral 38 is provided and includes a shank portion 40 loosely received through the bores 30 and 34 and the counterbore 36, a first small diameter head 42 on its outer end and a second large diameter head 44 disposed outwardly of the small diameter head 42. The head 44 is seated in the counterbore 32 and the head 42 is slidingly received in the bore 30 with the shank or shank portion 40 projecting inwardly through the counterbore 36 and the bore 34. A dielectric washer 46 constructed of any suitable non-conductive material is provided about the shank portion inwardly of the brake shoe 14 and includes an integral sleeve portion 48 which projects into the adjacent end of the bore 34 and terminates a spaced distance from the remote end of the bore 34 when the washer 46 is abutted with the inner surface of the shoe 14. In addition, a compression spring 50 is disposed about the shank portion 40 and abuts the dielectric washer 46. An abutment washer 52 is disposed about the shank portion 40 on the side of the spring 50 remote from washer 46 and the shank portion 40 includes diametrically opposite abutments 54 and limiting movement of the abutment washer 52 away from the washer 46 relative to the shank portion 40.

A conductive wire 56 has one end thereof secured to the contact pin 38 and an electrical lamp 58 is serially electrically connected in each wire 56. The ends of the wires 56 remote from the contact pins 38 are electrically connected to a wire 60 and the latter is electrically connected to a suitable source 62 of electrical potential through a wire 64 in which the ignition switch 66 of the vehicle is serially electrically connected. Of course, the brake shoes 14 are all grounded as is one side of the source 62.

The contact pins 38 are insulatively supported from the brake shoe 14 and brake linings 28 and therefore the lamps 58 will not be activated until such time as the heads 44 contact the drums 26. This of course will give an indication of whether all four shoes 14 are contacting the corresponding drums 26 at substantially the same time when the brakes are applied and moving from engagement with the drums 26 to terminate operation of the lamps 58 at substantially the same time when the brakes are released. Further, when the brake linings 28 wear down past the enlarged head 44, the worn-away heads 44 will no longer comprise abutments limiting inward movement of the contact pins 38 and the expansion springs 50 will shift the contact pins 38 inwardly to seat the heads 42 in the counterbores 36 and thus continuously electrically connect the corresponding lamps 58 with the source 62 whenever the ignition switch 66 is closed.

If it is desired, the rear contact pins 38 and the rear lamps 58 may be serially connected in the rear brake light circuits of the associated vehicle whereby the driver of another vehicle following the vehicle provided with the brake lining wear indicator of the instant invention will also be able to receive an indication whether the rear brakes of the vehicle head need relining or adjustment. In addition, if the rear contact pins 38 are serially connected in the rear brake light circuits of the associated vehicle, the driver of the vehicle will also be able to ascertain whether either or both his stop light bulbs are burned out.

If the rear indicator pins 38 are serially connected in the circuit leading to the rear stop lights of the associated vehicle, the rear stop lights would not be grounded to the stop light housing and thus to the vehicle frame but a separate wire would lead from the ground side of each rear stop light, to the corresponding indicator light 58 and then to the associated contact pin 38 for grounding at the adjacent brake shoe.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. In combination, a conductive and grounded brake shoe operatively associated with a grounded brake drum, a brake lining attached to said shoe and interposed between opposing faces of said shoe and said drum for frictional engagement with the latter in response to movement of the shoe from a rest position toward the drum, said lining and shoe having aligned fores formed therethrough, the lining bore including a counterbore at the end thereof remote from the shoe bore, the shoe bore including a counterbore opening into and generally the same size of the lining bore, and a conductive contact pin including a shank portion insulatively reciprocal through the shoe bore and counterbore and including a first enlarged head seated in said lining counterbore and a second slightly smaller diameter enlarged head slidable in said lining bore and the shoe counterbore, and electrically energized circuit means electrically connecting said contact pin with a suitable source of electrical potential and a source with a ground, said circuit means including electrically actuatable signal means.

2. The combination of claim 1 including force means operatively connected with said contact pin biasing the latter in a longitudinal direction shifting said head toward a position seated in the shoe counterbore.

3. The combination of claim 2 including a dielectric washer disposed about said pin on the side of said shoe remote from lining and including a sleeve portion projecting into the shoe bore through which the shank portion of said pin is guidingly reciprocal, said force means comprising a compression spring disposed about the shank portion of said pin disposed outwardly of said washer, said spring having one end abutted against said washer and said shank portion including abutment means spaced outwardly from said washer against which the other end of said spring is abutted.

4. In combination, a conductive brake shoe operatively associated a conductive drum, a dielectric lining carried by said shoe and shiftable, upon shifting of said shoe relative to said drum, into frictional engagement with said drum, and contact means, support means supporting said contact means from said shoe in an initial position insulated relative to said shoe and disposed for electrical contact with said drum upon contact of said lining with said drum and automatic shifting to a subsequent position in electrical contact with said shoe in response to wear, of predetermined amount, on said lining by frictional engagement with said drum.

5. The combination of claim 4 wherein said contact means is elongated and extends through said lining and shoe, said support means including means supporting said contact means from said shoe for longitudinal shifting from said rest position with one end thereof flush with the adjacent surfaces of said lining opposing said drum toward said subsequent position with said one end shifted away from said drum, force means biasing said contact means toward said subsequent position, said support means also including an abutment portion recessed in said lining and overlying a portion of the lining retaining said contact means against shifting from said rest position to said subsequent position and adapted to be worn away with said lining as the portion of the lining between said portion of said lining and said drum wear away.

6. The combination of claim 4 wherein said force means includes a compression spring disposed about said contact means and with opposite ends applying its biasing force on said contact means and said shoe.

7. The combination of claim 4 wherein said contact means is electrically connected to a circuit having electrically actuatable signal means disposed therein and adapted to be electrically connected to a suitable source of electrical potential having a ground common with said shoe.

References Cited

UNITED STATES PATENTS

| | | | |
|---|---|---|---|
| 3,271,737 | 9/1966 | Bezemek | 340—52A |
| 3,385,256 | 5/1968 | Forbush | 340—52A |

ALVIN H. WARING, Primary Examiner

H. S. COHEN, Assistant Examiner

U.S. Cl. X.R.

200—61.4